(12) United States Patent
Schroeder et al.

(10) Patent No.: US 10,260,558 B2
(45) Date of Patent: Apr. 16, 2019

(54) ROTARY MACHINE HAVING MAGNETIC AND MECHANICAL BEARINGS

(71) Applicants: Ulrich Schroeder, Mont-Saint-Aignan (FR); Eduardo Carrasco, Saint Etienne sous Bailleul (FR)

(72) Inventors: Ulrich Schroeder, Mont-Saint-Aignan (FR); Eduardo Carrasco, Saint Etienne sous Bailleul (FR)

(73) Assignee: SKF Magnetic Mechatronics, rue des Champs, Saint-Marcel (FR)

( * ) Notice: Subject to any disclaimer, the term of this patent is extended or adjusted under 35 U.S.C. 154(b) by 271 days.

(21) Appl. No.: 15/285,030

(22) Filed: Oct. 4, 2016

(65) Prior Publication Data

US 2017/0102030 A1  Apr. 13, 2017

(30) Foreign Application Priority Data

Oct. 8, 2015  (EP) .................................. 15306587.5

(51) Int. Cl.
| | |
|---|---|
| *H02K 7/09* | (2006.01) |
| *F16C 32/04* | (2006.01) |
| *F16C 17/08* | (2006.01) |
| *F16C 19/12* | (2006.01) |
| *F16C 27/00* | (2006.01) |
| *H02K 5/16* | (2006.01) |
| *F16C 19/10* | (2006.01) |
| *H02K 7/00* | (2006.01) |

(Continued)

(52) U.S. Cl.
CPC .......... *F16C 32/0402* (2013.01); *F16C 17/08* (2013.01); *F16C 19/10* (2013.01); *F16C 27/00* (2013.01); *F16C 32/048* (2013.01); *F16C 32/0476* (2013.01); *F16C 32/0487* (2013.01); *H02K 5/161* (2013.01); *H02K 7/09* (2013.01); *F16C 27/04* (2013.01); *F16C 32/0442* (2013.01); *F16C 2361/55* (2013.01); *H02K 2205/03* (2013.01)

(58) Field of Classification Search
CPC ...... H02K 7/09; H02K 2205/03; H02K 5/161; F16C 32/04; F16C 32/0402; F16C 39/06; F16C 17/08; F16C 19/10; F16C 19/12
See application file for complete search history.

(56) References Cited

U.S. PATENT DOCUMENTS

| | | | | |
|---|---|---|---|---|
| 2,651,550 A | * | 9/1953 | Sharp .................... | G01R 11/14 310/90.5 |
| 3,476,449 A | * | 11/1969 | Chaboseau ............ | F16C 17/06 310/90.5 |

(Continued)

FOREIGN PATENT DOCUMENTS

| | | |
|---|---|---|
| EP | 0575619 A1 | 12/1993 |
| FR | 2785734 A1 | 5/2000 |
| WO | 03061098 A1 | 7/2003 |

*Primary Examiner* — Edgardo San Martin
(74) *Attorney, Agent, or Firm* — Bryan Peckjian; SKF USA Inc. Patent Dept.

(57) ABSTRACT

A rotary machine provides a stator having a stator casing, and a rotor shaft having a rotational axis and supported in the stator casing by at least one radial magnetic bearing. The rotary machine further provides an axial mechanical thrust bearing being disposed proximate a radial surface of one end of the rotor shaft, the axial mechanical thrust bearing, including a rolling element located on the rotational axis of the rotor shaft.

11 Claims, 2 Drawing Sheets

(51) Int. Cl.
*F16C 32/00* (2006.01)
*F16C 27/04* (2006.01)

(56) References Cited

U.S. PATENT DOCUMENTS

| | | | | |
|---|---|---|---|---|
| 3,575,536 A * | 4/1971 | Jacobs | ..................... | B67D 1/10 |
| | | | | 310/104 |
| 3,614,180 A * | 10/1971 | Beer | ................... | F16C 32/0427 |
| | | | | 310/90.5 |
| 3,771,910 A * | 11/1973 | Laing | ..................... | F04D 13/06 |
| | | | | 417/420 |
| 3,934,950 A * | 1/1976 | Kuhlmann | .............. | F16C 17/08 |
| | | | | 310/90.5 |
| 4,303,281 A * | 12/1981 | Irby | ..................... | B23B 31/005 |
| | | | | 310/90.5 |
| 4,541,772 A * | 9/1985 | Becker | ................ | F04D 19/042 |
| | | | | 415/90 |
| 4,755,709 A * | 7/1988 | De Jager | ................ | F16C 17/08 |
| | | | | 310/43 |
| 6,019,319 A * | 2/2000 | Falbel | ................... | B64G 1/285 |
| | | | | 244/165 |
| 6,026,103 A * | 2/2000 | Oliver | ................... | H01S 3/036 |
| | | | | 372/37 |
| 6,124,658 A * | 9/2000 | Coenen | ................... | D01H 4/12 |
| | | | | 310/90 |
| 6,686,673 B1 * | 2/2004 | Komura | ................. | F16C 17/10 |
| | | | | 310/67 R |
| 6,688,861 B2 * | 2/2004 | Wampler | .............. | F16C 39/063 |
| | | | | 415/900 |
| 9,892,839 B2 * | 2/2018 | Sanders | ................ | H01F 7/206 |
| 2003/0057793 A1 * | 3/2003 | Yang | ..................... | H02K 7/06 |
| | | | | 310/191 |
| 2005/0184609 A1 * | 8/2005 | Chen | ..................... | F16C 17/08 |
| | | | | 310/90.5 |
| 2006/0083453 A1 * | 4/2006 | Okumura | ................ | F16C 23/08 |
| | | | | 384/446 |
| 2016/0377147 A1 * | 12/2016 | Sun | ....................... | F16F 15/315 |
| | | | | 74/572.1 |
| 2017/0167894 A1 * | 6/2017 | Schroeder | ........... | F16C 32/0406 |
| 2017/0167943 A1 * | 6/2017 | Schroeder | ........... | F16C 32/0446 |
| 2017/0324304 A1 * | 11/2017 | Ito | ......................... | H02K 11/21 |

* cited by examiner

ROTARY MACHINE HAVING MAGNETIC AND MECHANICAL BEARINGS

CROSS REFERENCE TO RELATED APPLICATIONS

This application claims priority to European patent application no. 15306587.5 filed on Oct. 8, 2015, the contents of which are fully incorporated herein by reference.

FIELD OF THE INVENTION

The present invention relates to the field of rotary machines providing magnetic bearings for supporting the weight and load of a rotor of the rotary machine by active magnetic bearings thanks to magnetic fields. In particular, the invention relates to an auxiliary mechanical bearing for a radially magnetically suspended rotor system.

BACKGROUND OF THE INVENTION

It is known to provide axial and radial magnetic bearings in rotary machines having a vertical rotor arrangement and to provide auxiliary mechanical touch down bearings supporting the rotor in case of failure of the magnetic bearings, for example if the magnetic bearings are overloaded or if the electrical or electronic control system fails.

Magnetic bearings operate without mechanical friction, but require continuous supply of electrical power.

Furthermore, rotary machines having constant, unidirectional thrust load, such as for example flywheels, only requires good dynamic performances of the radial magnetic bearings. Indeed, the axial magnetic bearing only supports the rotor weight.

One aim of the present invention is to provide a rotary machine without such axial magnetic bearing in order to reduce manufacturing costs of such rotary machine as well as electrical power consumption.

There is a need to define and dimension correctly auxiliary mechanical touch down bearings so as to fully guarantee that the rotary machine will not be damaged.

BRIEF SUMMARY OF THE INVENTION

It is a particular object of the present invention to provide a rotary machine comprising a stator having a stator casing, and a rotor shaft having a rotational axis and supported in the stator casing by at least one radial magnetic bearing.

The rotary machine provides an axial mechanical thrust bearing at the vicinity of a radial surface of one end of the rotor shaft. The axial mechanical thrust bearing provides a rolling element located on the rotational axis of the rotor shaft.

In one embodiment, the rolling element is in direct axial contact with one end of the rotor shaft so that the rotor shaft rotates permanently on the rolling element.

The axial contact between the axial mechanical thrust bearing and the rotor shaft does not generate radial forces on the radial magnetic bearings.

Furthermore, the replacement of the axial magnetic bearing by such axial mechanical thrust bearing allows reducing power consumption and manufacturing costs.

In another embodiment, the axial mechanical thrust bearing is in axial contact with one end of the rotor shaft and provides a bearing mounted between a stator plate and one end of the rotor shaft and designed to support the rotor weight, the stator plate being supported by the rolling element. In this embodiment, the lower rotor shaft is not in direct contact with the rolling element but with the bearing, which reduces the wear of the rolling element and thus the service life of the axial mechanical thrust bearing.

Advantageously, the stator plate is fixed to the stator casing by elastic means.

The elastic means allow decoupling the radial magnetic bearing function from the axial mechanical thrust bearing. Indeed, the stator plate thus does not rotate, the rolling element can roll freely in the radial direction and the rotor can move freely in the airgap of the radial magnetic bearings. The radial magnetic bearing can actively control the rotor movement and position and is no more disturbed.

For example, the elastic means provide at least three springs, each spring being fixed to the circumference of the stator plate and an inner circumference of the stator casing.

As an alternative, the elastic means provide an O-ring radially surrounding the stator plate.

In an embodiment, in the rolling bearing provides an inner ring mounted on the stator plate, an outer ring mounted on a radial surface of one end of the rotor shaft, and at least one circular row of rolling elements located between the inner and outer rings.

In an embodiment, the rolling bearing provides two circular rows of rolling elements located between the inner and outer rings.

In an embodiment, the rolling element located on the rotational axis of the rotor shaft is a ball.

In an embodiment, the rotary machine provides lower and upper radial touch down bearings so as to radially support the rotor shaft in case of failure of the radial magnetic bearing.

In an embodiment, the rotary machine provides two radial magnetic bearings.

In an embodiment, the rotary machine provides an axial magnetic bearing, so that the axial mechanical thrust bearing (24, 30) comes in axial contact with one end (16b) of the rotor shaft (16) when the axial magnetic bearing fails. In this case there is a mechanical gap between the rolling element and the shaft end and then the rolling element becomes an auxiliary axial touch down bearing.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which

DETAILED DESCRIPTION OF THE INVENTION

Figure 1:
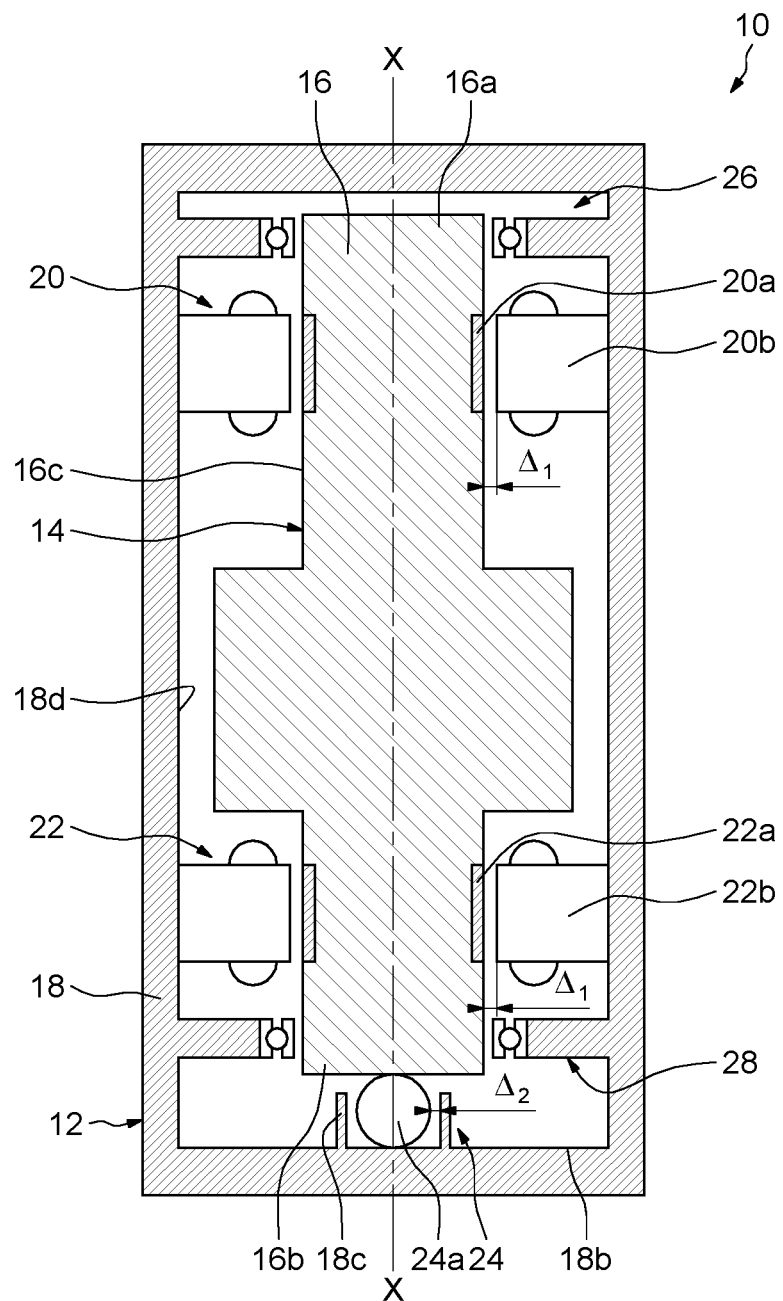
FIG. 1 is an axial half-section view of a rotary machine having an active radial magnetic bearing and an axial mechanical thrust bearing according to first embodiment of the invention.

A first embodiment of a rotary machine 10 is illustrated on FIG. 1; the rotary machine 10 may for example be a flywheel, or any rotary machine having a vertical rotor arrangement.

The rotary machine 10 provides a stator 12 and a rotor 14 having a shaft 16 rotating around a vertical axis X-X. The rotor shaft 16 is supported rotatably with respect to a casing 18 of the stator 12 by two radial magnetic bearings 20, 22 and an axial mechanical thrust bearing 24. The two radial magnetic bearings 20, 22 may be identical and arranged at opposite ends 16a, 16b of the rotor shaft 16.

Each radial magnetic bearing 20, 22 provides an annular armature 20a, 22a made of ferromagnetic material mounted on an outer cylindrical surface 16c of the rotor shaft 16 and a stator armature 20b, 22b secured to the stator casing 18. The stator armatures 20b, 22b each provides, in a conventional manner, a stator magnetic circuit having one or more annular coils and ferromagnetic body and are placed facing the rotor armature 20a, 22a so as to define a radial airgap Δ1. The details of the stator armatures are not shown on the Figures.

As illustrated on FIG. 1, the axial mechanical thrust bearing 24 is arranged between a lower end portion 18b of the stator casing 18 and the lower end 16b of the rotor shaft 16. The axial mechanical thrust bearing 24 supports the rotor weight. The axial mechanical thrust bearing 24 provides a rolling element, such as for example a ball 24a, located in the center of the rotor shaft 16, on the same rotational axis X-X. The ball 24a is radially surrounded by an annular cylindrical protuberance 18c of the stator casing 18, extending towards the lower end 16b of the rotor shaft 16. A radial airgap Δ2 is defined between annular cylindrical protuberance 18c and the ball 24a. The ball 24a is in direct axial contact with the lower end 18b of the rotor shaft 18 so that the rotor shaft 18 rotates permanently on the ball 24a without generating radial forces on the radial magnetic bearings 20, 22.

Lower and an upper radial touch down bearings 26, 28 are located respectively at the lower and upper ends 16a, 16b of the rotor shaft 16, so as to radially center the rotor shaft 16 in case of failure of the radial magnetic bearings 20, 22. The lower and an upper radial touch down bearings 26, 28 are of the ball bearing type.

Figure 2:
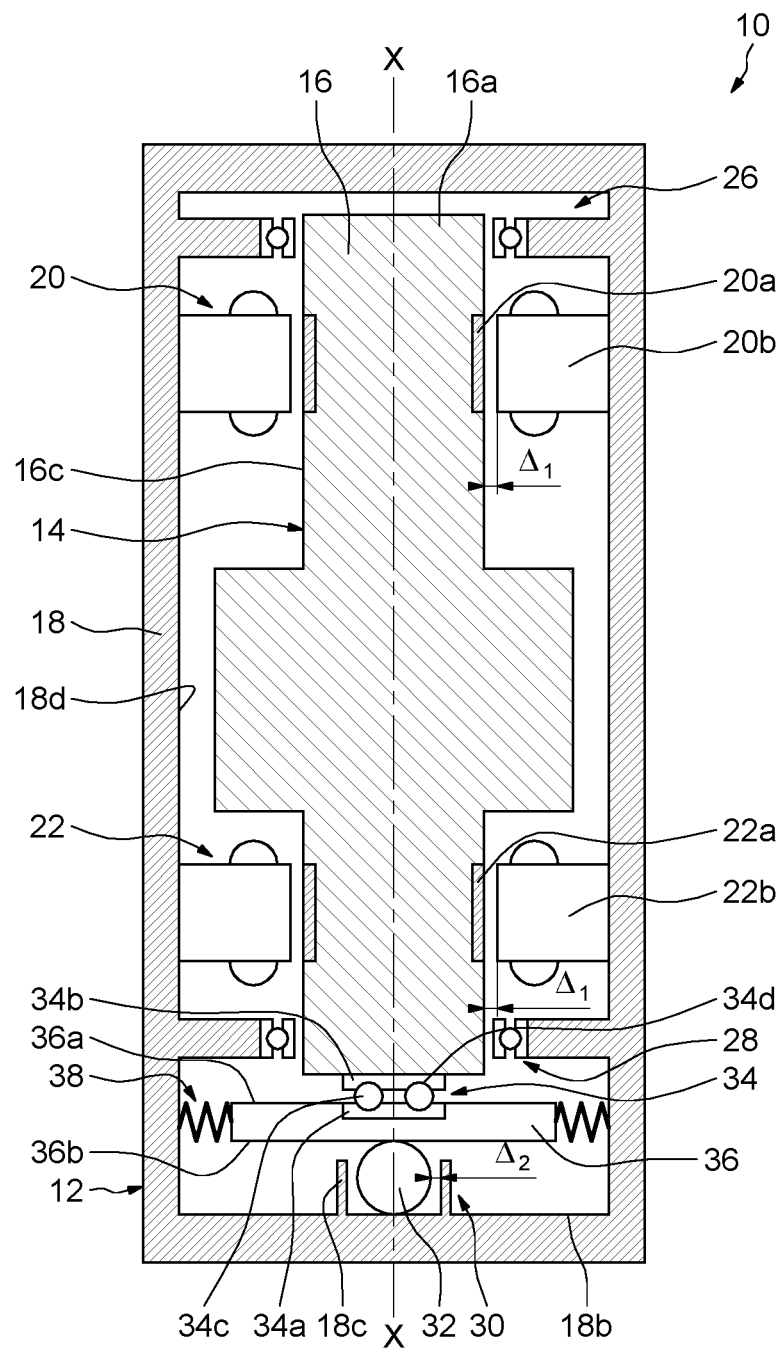
FIG. 2 is an axial half-section view of a rotary machine having an active radial magnetic bearing and an axial mechanical thrust bearing according to second embodiment of the invention.

The embodiment illustrated in FIG. 2, wherein the same elements have the same references, only differs from the embodiment illustrated in FIG. 1 by the structure of the axial mechanical thrust bearing.

As illustrated on FIG. 2, the rotary machine 10 provides a stator 12 and a rotor 14 having a shaft 16 rotating around a vertical axis X-X. The rotor shaft 16 is supported rotatably with respect to a casing 18 of the stator 12 by two radial magnetic bearings 20, 22 and an axial mechanical thrust bearing 30. The two radial magnetic bearings 20, 22 may be identical and arranged at opposite ends 16a, 16b of the rotor shaft 16.

Each radial magnetic bearing 20, 22 provides an annular armature 20a, 22a made of ferromagnetic material mounted on an outer cylindrical surface 16c of the rotor shaft 16 and a stator armature 20b, 22b secured to the stator casing 18. The stator armatures 20b, 22b each provides, in a conventional manner, a stator magnetic circuit having one or more annular coils and ferromagnetic body and are placed facing the rotor armature 20a, 22a so as to define a radial airgap Δ1. The details of the stator armatures are not shown on the Figures.

Lower and an upper radial touch down bearings 26, 28 are located respectively at the lower and upper ends 16a, 16b of the rotor shaft 16, so as to radially center the rotor shaft 16 in case of failure of the radial magnetic bearings 20, 22. The lower and an upper radial touch down bearings 26, 28 are of the ball bearing type.

As illustrated on FIG. 2, the axial mechanical thrust bearing 30 is arranged between a lower end portion 18b of the stator casing 18 and the lower end 16b of the rotor shaft 16. The axial mechanical thrust bearing 30 is located in the center of the rotor shaft 16, on the same rotational axis X-X and supports the rotor weight. The axial mechanical thrust bearing 30 provides a rolling element, such as for example a ball 32, radially surrounded by an annular cylindrical protuberance 18c of the stator casing 18, extending towards the lower end 16b of the rotor shaft 16. A radial airgap Δ2 is defined between annular cylindrical protuberance 18c and the ball 32.

The axial mechanical thrust bearing 30 further provides a rolling bearing 34 mounted between a stator plate 36 and the lower end 16b of the rotor shaft 16 and designed to support the rotor weight.

The ball 32 is in direct axial contact with the lower surface 36b of the stator plate 36 in order to reduce the wear of the ball, and thus increasing the service life of the axial mechanical thrust bearing.

The stator plate 36 is fixed to the stator casing 18 by elastic means 38 providing for example three springs, each spring being fixed to the circumference end of the stator plate 36 and an inner circumference 18d of the stator casing 18. As an alternative, the elastic means may provide an O-ring or an undulated metal ribbon radially surrounding the stator plate 36. Thanks to the elastic means, the radial magnetic bearing function may be decoupled from the axial mechanical thrust bearing.

As illustrated, the rolling bearing 34 provides an inner ring 34a secured to the upper surface 36a of the stator plate 36, an outer ring 34b mounted on an radial surface of the lower end 16b of the rotor shaft 16, a circular row of rolling elements 34c, 34d located between the inner and outer rings 34a, 34b. Thanks to the rolling bearing, the stator plate does not rotate.

Such particular structure of the axial mechanical bearing allows the ball 32 to roll freely in the radial direction and the rotor 16 to move freely in the radial airgap Δ1 of the radial magnetic bearings 20, 22. The radial magnetic bearings can thus actively control the rotor movement and position and is no more disturbed by the axial mechanical thrust bearing 30.

The second embodiment has been illustrated on the basis of an axial mechanical thrust bearing providing a rolling bearing provided with at least one row of rolling elements radially disposed between the inner and outer rings. Alternatively, the bearing may be a plain bearing or a sliding bearing providing one or two rings.

As an alternative, the embodiments illustrated on the Figures may be applied to a rotary machine having an axial magnetic bearing (not shown). In case the rotary machine provides an axial magnetic bearing, the axial mechanical thrust bearing comes into service when the axial magnetic bearing fails due to an electrical power cut or if its load capacity is exceeded. The axial mechanical thrust bearing provides a safety bearing without disturbing the radial magnetic bearings. In normal operation there is thus a mechanical gap between the axial mechanical thrust bearing and the shaft.

Thanks to the invention, manufacturing costs of the rotary machine as well as electrical power consumption are reduced without disturbing the radial magnetic bearings.

The invention claimed is:
1. A rotary machine comprising:
a stator having a stator casing, and
a rotor shaft having a rotational axis (X-X) and supported in the stator casing by at least one radial magnetic bearing, and an axial mechanical thrust bearing being disposed proximate a radial surface of one end of the rotor shaft, the axial mechanical thrust bearing having a rolling element located on the rotational axis (X-X) of the rotor shaft, wherein the axial mechanical thrust bearing is in axial contact with one end of the rotor shaft and provides a bearing mounted between a stator plate and one end of the rotor shaft and designed to support the rotor weight, the stator plate being supported by the rolling element.

2. A rotary machine comprising:

a stator having a stator casing, and a rotor shaft having a rotational axis (X-X) and supported in the stator casing by at least one radial magnetic bearing, and an axial mechanical thrust bearing being disposed proximate a radial surface of one end of the rotor shaft, the axial mechanical thrust bearing having a rolling element located on the rotational axis (X-X) of the rotor shaft, wherein the rolling element is in direct axial contact with one end of the rotor shaft so that the rotor shaft rotates permanently on the rolling element.

3. The rotary machine according to claim 1, wherein the stator plate is fixed to the stator casing by elastic means.

4. The rotary machine according to claim 3, wherein the elastic means comprises at least three springs, each spring being fixed to the circumference of the stator plate and an inner circumference of the stator casing.

5. The rotary machine according to claim 3, wherein the elastic means comprises an O-ring radially surrounding the stator plate.

6. The rotary machine according to claim 1, wherein the bearing comprises an inner ring mounted on the stator plate, an outer ring mounted on a radial surface of one end of the rotor shaft, and at least one row of rolling elements located between the inner and outer rings.

7. The rotary machine according to claim 6, wherein the bearing further comprises one circular row of rolling elements located between the inner and outer rings.

8. The rotary machine according to claim 1, wherein the rolling element located on the rotational axis (X-X) of the rotor shaft is a ball.

9. The rotary machine according to claim 1, further comprising lower and upper radial touch down bearings that radially support the rotor shaft in case of failure of the radial magnetic bearing.

10. The rotary machine according to claim 1, further comprising two radial magnetic bearings.

11. The rotary machine according to claim 1, further comprising an axial magnetic bearing, wherein the axial mechanical thrust bearing comes in axial contact with one end of the rotor shaft when the axial magnetic bearing fails.

* * * * *